United States Patent [19]

Anderson et al.

[11] Patent Number: 5,768,062
[45] Date of Patent: Jun. 16, 1998

[54] DISK DRIVE HAVING RIGID ACTUATOR ARM STRUCTURES

[75] Inventors: Scott K. Anderson, Meridian, Id.; Richard H. Henze, San Carlos, Calif.

[73] Assignee: Hewlett-Packard Company, Palo Alto, Calif.

[21] Appl. No.: 802,467

[22] Filed: Feb. 19, 1997

Related U.S. Application Data

[63] Continuation of Ser. No. 471,929, Jun. 6, 1995, abandoned.

[51] Int. Cl.[6] .................................. G11B 5/48; G11B 5/55
[52] U.S. Cl. ................................................ 360/106; 360/104
[58] Field of Search ................................ 360/97.01, 104, 360/106

[56] References Cited

U.S. PATENT DOCUMENTS

| | | | |
|---|---|---|---|
| 4,985,652 | 1/1991 | Oudet et al. | 310/15 |
| 5,121,273 | 6/1992 | Slezak | 360/104 |
| 5,392,176 | 2/1995 | Anderson | 360/97.01 |
| 5,422,764 | 6/1995 | McIlvanie | 360/97.01 |
| 5,452,151 | 9/1995 | Money et al. | 360/106 |

FOREIGN PATENT DOCUMENTS

0494033A1  7/1992  European Pat. Off. .

*Primary Examiner*—Stuart S. Levy
*Assistant Examiner*—David D. Davis

[57] ABSTRACT

A disk drive having a pair of axially spaced disks has a rotary actuator/head assembly in which a single rigid actuator arm projects between the axially spaced disks. A gimbal spring is mounted to each surface of the opposite surfaces at one distal end of the rigid actuator arm. Each gimbal spring mounts a slider having a magnetic head, the individual magnetic heads confronting the respective disk surfaces. The proximal ends of respective cantilever load springs are mounted to opposite surfaces of the rigid arm and their distal ends engage and spring bias the respective sliders against the respective disk surfaces. A printed circuit coil on one or both surfaces of the other distal end of the rigid actuator arm is the armature of an axial gap actuator motor, having a permanent magnet stator. Printed circuit traces mounted to the rigid actuator arm connect the printed circuit coil to bonding pads of a group of bonding pads on the rigid actuator arm at a location on the rigid actuator arm adjacent the axis of rotation. Other printed circuit traces mounted to the gimbal springs and to the rigid arm, connect the respective magnetic heads to other bonding pads of the group of bonding pads. Individual circuits of a flat flexible cable are connected to respective bonding pads for coupling electrical signals to and from said magnetic heads and for coupling bi-polar direct current to said printed circuit coil.

9 Claims, 5 Drawing Sheets

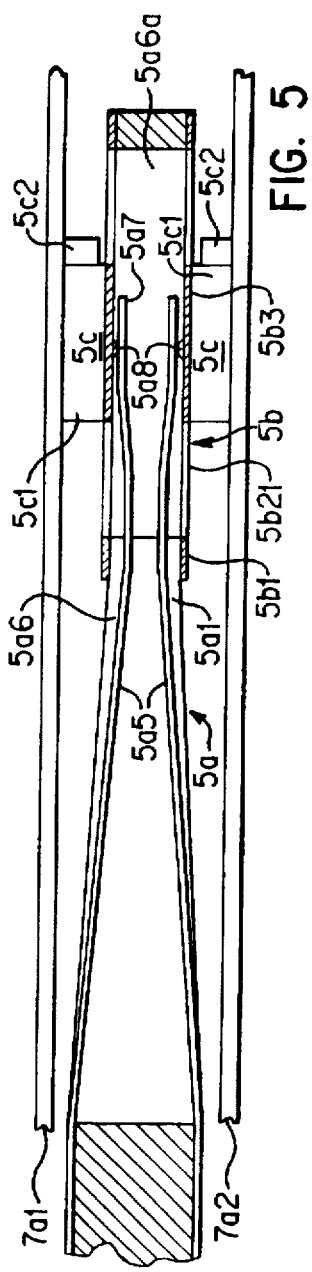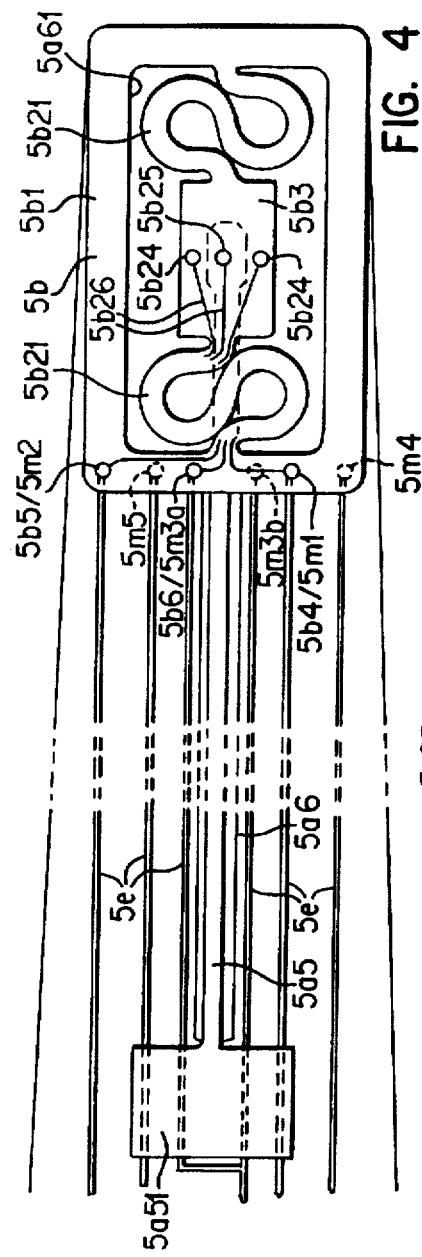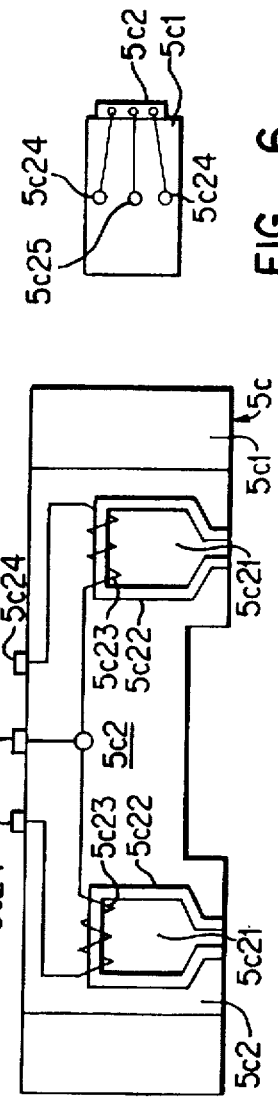

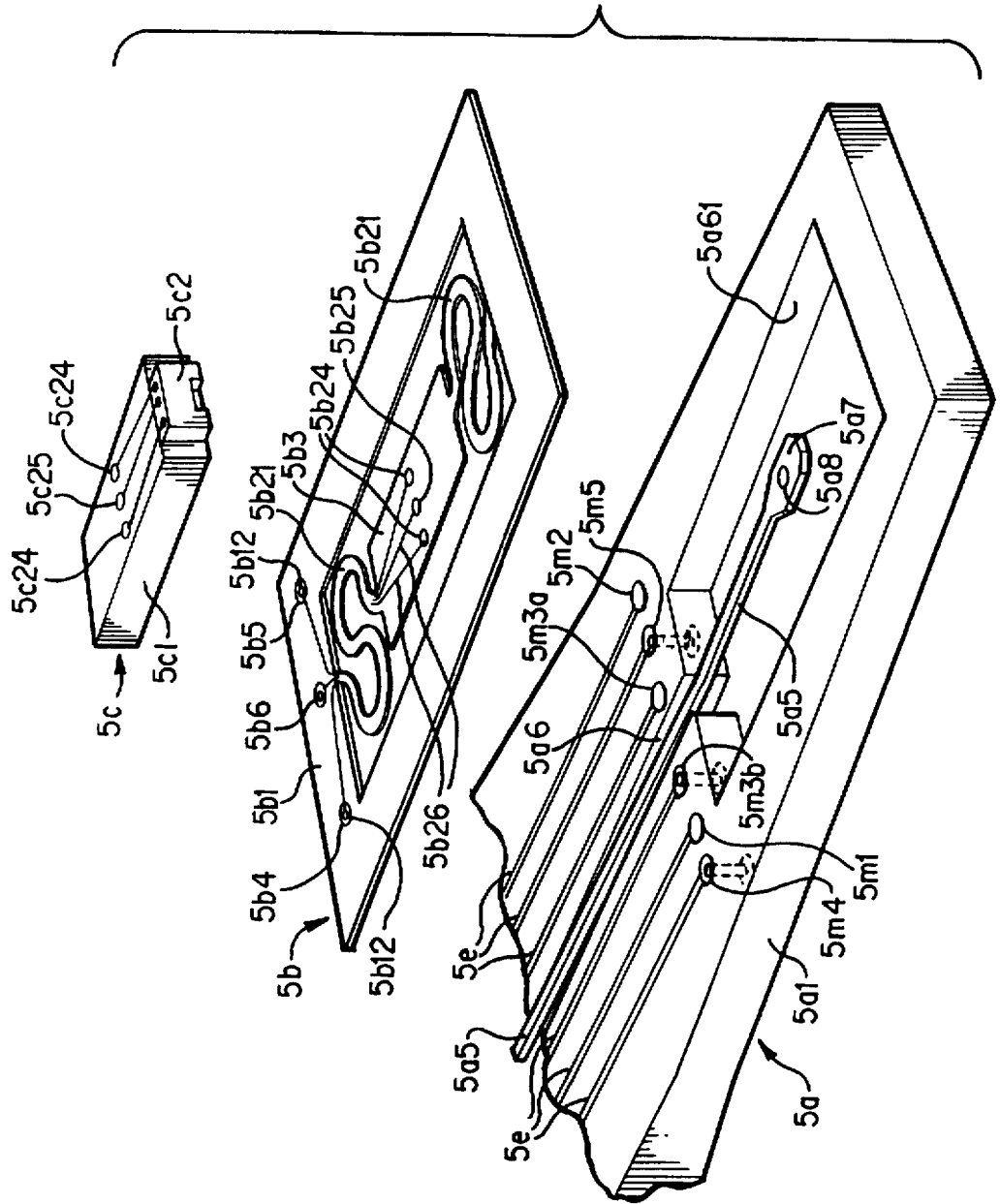

1

DISK DRIVE HAVING RIGID ACTUATOR ARM STRUCTURES

This is a continuation of application Ser. No. 08/471,929 filed on Jun. 6, 1995 now abandoned.

RELATED APPLICATIONS

Patent application Ser. No. 08/321,498, filed Oct. 12, 1994, entitled "Head Suspension Assembly Having Parallel-Coupled Load/Gimbal Springs", Richard H. Henze, inventor, assigned to the assignee of this invention.

Patent application Ser. No. 08/097,812, now Pat. No. 5,392,176, filed Jul. 26, 1993, entitled "Recording/Reproducing Device Employing Device Housing And Printed Circuit Board And Electronics As Structural And Functional Part Of Media Drive Motor And The Media Drive Motor, Scott K. Anderson, inventor, assigned to the assignee of this invention.

TECHNICAL FIELD

This invention relates to disk recording/reproducing devices, such as disk drives, and more particularly to a disk drive having a rigid arm actuator structure.

BACKGROUND OF THE INVENTION

Disk drives typically comprise, a memory disk structure which includes a memory disk assembly powered by a disk spindle motor, and, an actuator structure which comprises a head/actuator arm assembly on a movable support powered by an actuator motor. The actuator structure in a disk drive may be either of the rotary or linear type and functions under controlled actuator motor power to move the head, such as a magnetic head, to different radial positions on a disk of the memory disk assembly in track seeking and track following modes of operation.

The memory disk structure comprises one or more disks in a memory disk assembly mounted on a disk spindle hub which is driven by a disk spindle motor on the base of the disk drive housing. In the memory disk assembly, one or more disks are clamped on the disk spindle hub, multiple disks being axially spaced, by ring spacers, a sufficient distance to clear therebetween a head/actuator arm assembly of an actuator armstack. The stator of the disk spindle motor is assembled within the disk spindle hub. The disk spindle hub functions as the motor rotor.

In describing conventional disk drives herein in terms of a rotary actuator type of disk drive, the relationship to linear types of disk drives is readily apparent.

In a rotary actuator armstack, the movable support for the head/actuator arm assembly comprises an actuator hub which is rotatably journaled on an actuator spindle mounted on the disk drive base. One or more cantilever load beams, of spring material, are mounted to the actuator hub, either directly as in U.S. Pat. No. 5,283,704, to Reidenbach, or by means of rigid arms as in U.S. Pat. No. 4,829,395, to Coon et al. The load beams each mount a transducer assembly at their distal ends. This forms a flexible cantilever actuator armstack, having a low spring rate, for providing the dynamic spring loading of the transducer assembly in its flight on the air bearing at the disk surface. In the case where the actuator armstack is associated with only one disk surface, only one load beam and transducer assembly is required in scanning a disk surface. In the case where a pair of axially spaced disks are employed in a disk drive, two load beams in back-to-back relationship are mounted to the actuator hub. The load beams together with their respective transducer assemblies fit between the axially spaced disks.

A transducer assembly comprises a slider and a magnetic head. A gimbal spring on the distal end of each load beam is employed to mount the transducer assembly. The slider of the transducer assembly is mounted to the gimbal spring. The function of the gimbal spring, while restraining the slider against lateral and longitudinal translatory movement and angular in yaw relative to the loadbeam, and, hence, relative to the disk, is to permit limited spring loaded angular movement of the attached slider in roll and in pitch relative to the load beam and to the disk surface.

When the disk drive is not in use, each load beam spring loads the attached slider against the surface of the disk. In operation, the slider is subject to a negative pressure air bearing and the spring load of the load beam and flies on the film of air clinging to the disk's surface and moving with the spinning disk.

An axial gap actuator motor, commonly called a "voice coil" motor, comprises a flat actuator motor coil, which is linked by the permanent magnet field of the actuator motor stator on the disk drive base. The flat actuator motor coil is separately wound and is mounted on a coil support arm connected to the actuator hub. The magnetic head and the actuator motor coil are hand wired to pads on the actuator structure to be separately controlled. The actuator motor coil is energized with direct current of reversible polarity. Interaction of the electromagnetic field of the actuator coil with the permanent magnet field of the stator displaces the coil in a planar arcuate path about the actuator pivot to correspondingly rotate the head/actuator assembly, moving the head to different radial locations with respect to the surface of the disk.

Such prior art structures involve the fabrication of numerous complex delicate parts and careful, time consuming assembly, involving extensive dependence upon specialized manual skills for fabrication, assembly and wiring. Complexity and delicacy of the parts and of the assembled product necessitate frequent time consuming inspections and tests in the course of part fabrication and progressive assembly, and require close control of the numerous part fabrication and product assembly steps to achieve acceptable product yields.

SUMMARY OF THE INVENTION

The best mode for practicing this invention is embodied in a rotary actuator type of disk drive which is used herein as the basis for describing this invention. The application of this invention to linear actuator types of disk drives, as well as to types of rotary actuator disk drives other than that specifically presented herein, is within the capabilities of those having ordinary skill in the art.

With decreasing form factors, a point is reached where extensive manual participation in the fabrication and assembly of parts for a disk drive is no longer cost effective, and, in some respects, not even feasible. A disk drive according to this invention employs unique structural designs for parts to adapt the parts to automatic fabrication and assembly techniques and to reduce the count of separate parts. This minimizes the need for manual intervention in part fabrication, reduces the complexity of assembly of the disk drive, reduces the requirement for testing, increases disk drive yield and results in a durable disk drive suited to its application and environment.

In the disk drive, a disk spindle motor is mounted to the base of the disk drive housing. A memory disk assembly of one or more disks is mounted to the rotor of the disk spindle motor to be rotated at a selected constant speed.

Implementation of the actuator structure or armstack, according to this invention, excludes the use of pairs of conventional flexible load beams projecting between the disks, employing in their place a single rigid actuator arm for mounting the two transducers, such as magnetic heads. Printed circuit technology is employed in fabricating the actuator motor coil and circuits associated with that coil and the heads on the individual rigid arms of the actuator structure. This significantly reduces the need for manual intervention in the fabrication of parts.

In greater detail, the head/actuator arm assembly of the rotary actuator armstack, in the best mode for practicing this invention, comprises an armstack of one or more rigid actuator arms. The actuator armstack is pivotally mounted to the base. Each rigid actuator arm has two distal ends, one on each side of the pivotal mount. A gimbal spring is mounted to one distal end of each rigid actuator arm. The gimbal spring mounts the slider carrying the magnetic head of the transducer assembly. An actuator motor coil is mounted to the other distal end of each rigid actuator arm. A cantilever load spring of low mass and low spring rate has a proximal end mounted to the rigid actuator arm and has a distal end which biases the slider against the adjacent surface of a memory disk. The force of the load spring acting on the slider in parallel with the gimbal spring force, is of a magnitude to balance the aerodynamic force of the air bearing acting on the slider at a selected flying height of the slider.

The actuator motor coil is part of an axial gap actuator motor, the permanent magnet stator for which is mounted on the base of the disk drive housing. Each rigid actuator arm is preferably fabricated of an electrical insulating material, such as a ceramic material. The actuator motor coil is a flat printed circuit coil, printed on one or both sides of the rigid actuator arm. Printed circuit traces on the rigid actuator arm connect the coils or windings of the magnetic head and the printed circuit actuator motor coil to individual bonding pads on the rigid actuator arm adjacent the pivot. Movement of the rigid actuator arm, in the case where the rigid actuator arm is associated with only one disk surface, positions the transducer assembly at different radial positions with respect to the single memory disk.

Where two axially spaced memory disks are employed, a transducer assembly is gimbal mounted on each of the opposite sides of the one distal end of the rigid actuator arm in corresponding opposed positions, and are moved together, between the disks, to different radial locations on the respective disks, by angular movement of the rigid actuator arm.

Where more than two memory disks are employed, additional rigid arms are stacked in the actuator armstack to move or pivot as a unit, in axially spaced positions corresponding to the axial spacing of the disks, to individually fit between the memory disks. Each arm carries its printed circuit actuator motor coil. A permanent magnet actuator motor stator stack on the base provides a permanent magnet actuator stator for one, or more, or all of the actuator motor coils, as required. Where more than one actuator motor is required, for example, to meet torque requirements, the actuator motor coils, individually associated with respective permanent magnet actuator stators, are energized in parallel.

This unique structural implementation of the disk drive embodies fewer parts, embodies parts of configurations which are adapted for automatic fabrication and assembly, minimizing the need for manual intervention in the fabrication and assembly process, increases the product yield and opens the door to cost effective fabrication of disk drives of smaller form factor and of improved mechanical volumetric efficiency.

DESCRIPTION OF THE DRAWINGS

A better understanding of this invention will be had by reference to the following specification when considered in conjunction with the accompanying drawings, in which:

FIGS. 4 and 5, are respectively, plan and longitudinal sectional views, drawn to an enlarged scale, of a head/rigid actuator arm assembly according to this invention.

FIG. 6, is a plan view of the transducer assembly, drawn to the scale of FIG. 4.

FIG. 7, is an enlarged end view of the slider and the transducer assembly, and

FIG. 8, is an exploded isometric view of the head/rigid actuator arm assembly of FIGS. 4 and 5.

DESCRIPTION OF THE PREFERRED EMBODIMENTS

Figure 1:
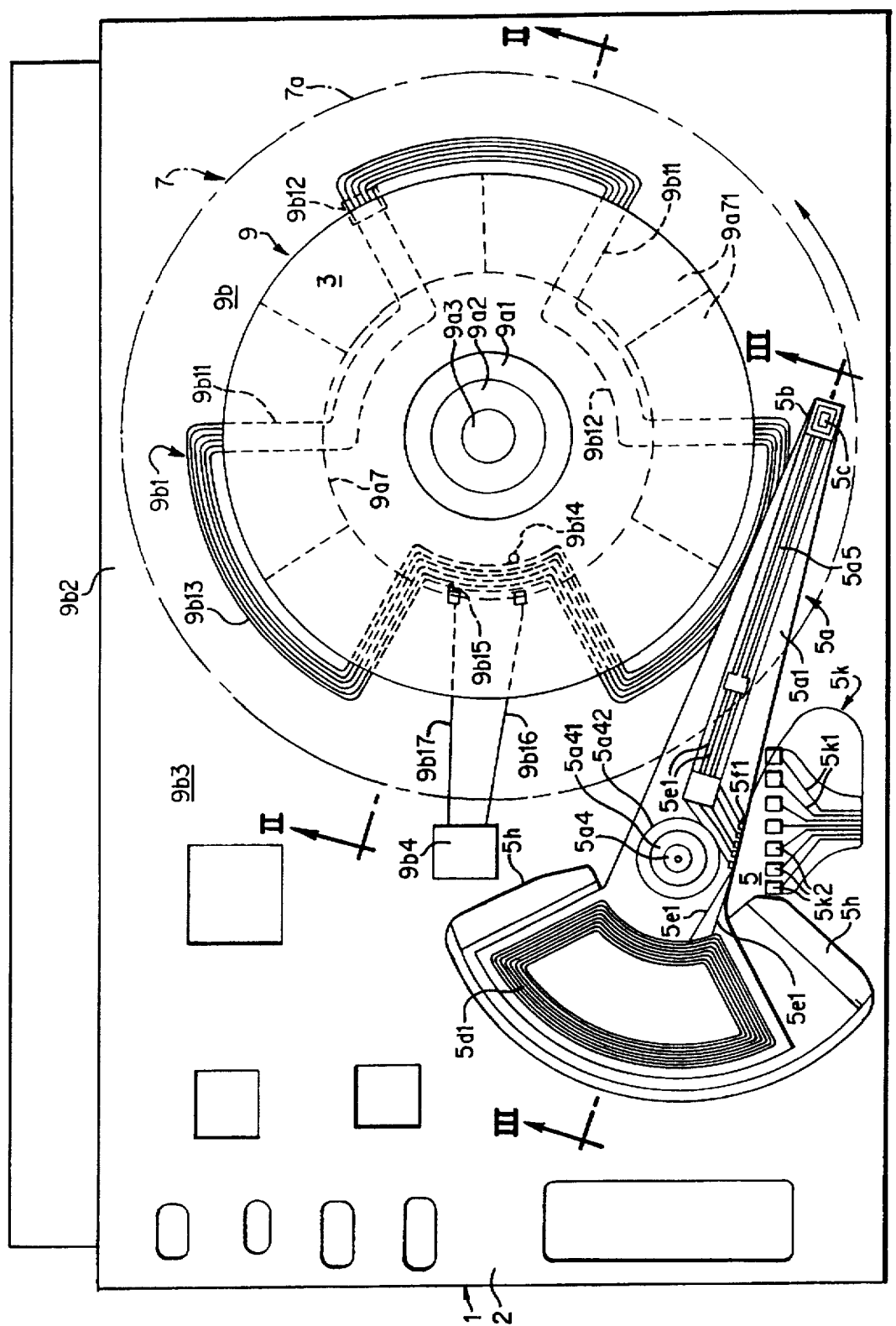
FIG. 1, is a plan view of a disk recording/reproducing device, as in a disk drive, embodying the principles of this invention.

A disk drive embodying the principles of this invention and representing the presently known best mode for practicing this invention is illustrated in FIG. 1. The disk drive comprises a housing 1 which has a base, 2. The base 2 supports a memory disk structure, 3, and an actuator structure, 5, which together comprise the principal parts of the disk drive. The base, 2, forms part of the disk drive housing and constitutes the primary support for the parts of the disk drive. The actuator armstack, 5, in this case, is of the rotary type. The principles of this invention apply equally to linear actuator drives.

Memory Disk Structure

Figure 2:
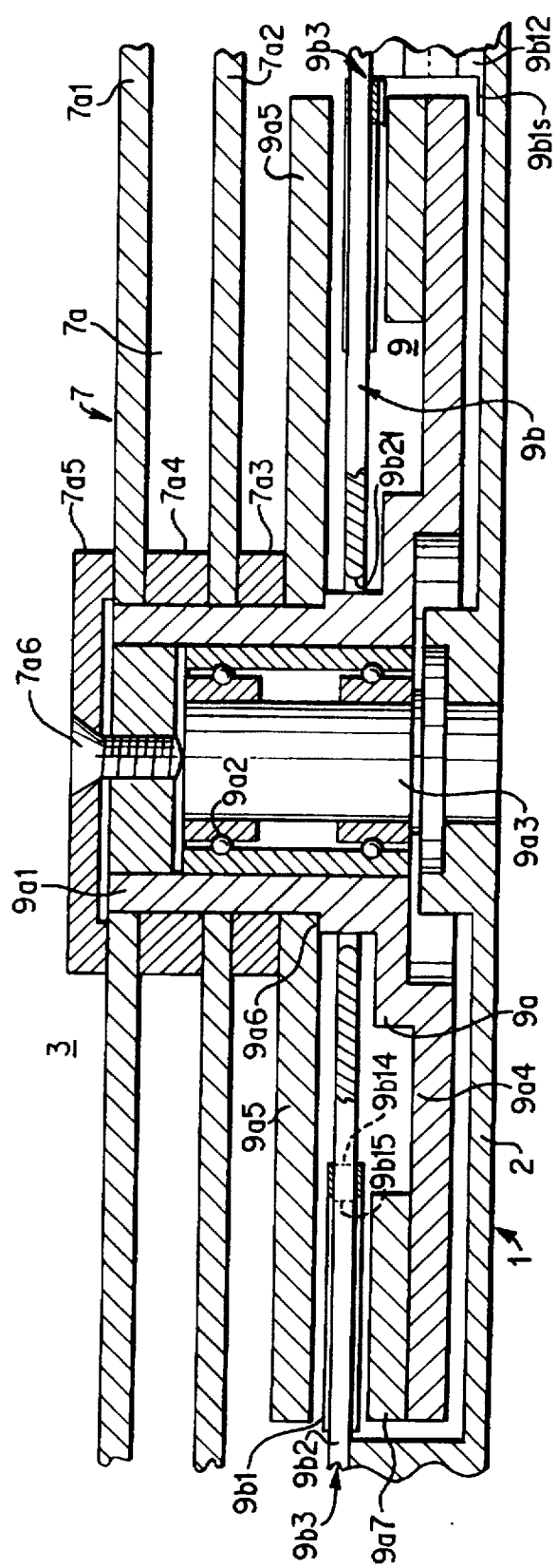
FIG. 2, is an enlarged sectional view of the memory disk structure of FIG. 1, viewed in the section plane taken on the section line II—II of FIG. 1.

The memory disk structure, 3, comprises a memory disk assembly, 7, shown in dot-dash outline in FIG. 1, and a disk spindle motor assembly, 9. As seen in FIG. 2, which is a view in the section plane II—II of FIG. 1, the memory disk assembly, 7, in this example, comprises two disks, 7a1, 7a2. The axial gap disk spindle motor, 9, as described in U.S. Pat. No. 5,aaa,bbb, referenced above, comprises a bobbin shaped motor rotor, 9a, which mounts a permanent magnet ring 9a7, and a motor stator, 9b, including a printed circuit winding, 9b1. A hub, 9a1, of the motor rotor, 9a, is journaled by a coaxial bearing pair, 9a2, on a disk motor spindle, 9a3, secured in the base, 2. Adhesive bonding or press fitting may be employed to secure the disk motor spindle, 9a3, in the base, 2, adhesive bonding being preferred. One or more memory disks, 7a, 7b, may be employed in the memory disk assembly, 7, as required, to provide the required disk drive data capacity.

The stator, 9b, of the disk spindle motor, 9, comprises a printed circuit stator winding, 9b1, on a thin printed circuit substrate, 9b2, of a printed circuit assembly, 9b3. The winding pattern is printed in exact registration on both sides of the substrate, 9b2, which doubles the winding turns and available motor torque. The inner end of the printed circuit winding on the top surface of the substrate, 9b2, is connected by a via, 9b14, to the inner turn of the printed circuit winding on the bottom surface of the substrate, 9b2. The outer end of the bottom printed circuit winding is brought to the upper surface of the substrate, 9b2, by a via, 9b15. The vias, 9b14, 9b15, are connected by printed circuit traces, 9b16, 9b17, to a driver, 9b4, on the printed circuit substrate, 9b2.

The thin printed circuit substrate, 9b2, of the printed circuit assembly, 9b3, is secured to the base, 2, on the side of the base on which the memory disk structure, 3, and the actuator structure, 5, are mounted. The printed circuit substrate, 9b2, is installed prior to securing the upper motor rotor plate, 9a5, on the motor rotor hub, 9a1. An opening, 9b21, FIG. 2, in the substrate 9b2 clears and encircles the rotor hub, 9a1. In this position, the printed circuit substrate, 9b2, occupies a position between the rotor plates, 9a4 and 9a5, of the motor rotor, 9a, placing the printed circuit motor stator winding, 9b1, in the axial gap between the ring magnet, 9a7, and the inner face of the upper rotor plate, 9a5. The ring magnet, 9a7, is axially spot magnetized, in alternate polarities, in six equally spaced circumferential positions, 9a71, seen in FIG. 1. The operation of the disk spindle motor, 9, is similar to that of a flat coil linear motor.

This disclosure of the disk spindle motor of this invention is adequate for the purposes of this invention. Further details of the construction and operation of the disk spindle motor may be had by reference to U.S. Pat. No. 5,392,176, referenced above, which is incorporated herein in its entirety by reference thereto.

Actuator Armstack

As seen in FIG. 1 herein, the actuator armstack, 5, comprises a rigid actuator arm, 5a1, overlapping the upper surface of the memory disk, 7a. Referring also to FIGS. 4–8, the gimbal spring, 5b, mounted to the distal end of the rigid actuator arm, 5a1, has a frame, 5b1, bonded about an opening, 5a61, in the distal end of the rigid actuator arm and has a gimbal plate, 5b3, which mounts a transducer assembly, 5c. The transducer assembly comprises a slider, 5c1, and a magnetic head, 5c2, FIGS. 5, 6, 7 and 8. FIG. 2 shows the relationship of the disk drive parts for a disk drive in which the memory disk assembly, 7, comprises two memory disks, 7a1,7a2.

The gimbal spring, 5b mounts the transducer assembly, 5c, to provide spring loaded longitudinal and lateral stiffness in translation and spring loaded angular freedom in pitch and roll, all with respect to the surface of the disk. The spring loading function of the load beam, which has been eliminated in this unique design, is provided by a low mass cantilever load spring, 5a5. The cantilever load spring, 5a5, has a proximal end, 5a51, secured to the rigid actuator arm and a distal end, 5a7 which bears against the gimbal plate, 5b3. To provide a precise point at which the load spring applies force to the gimbal spring, 5b, a dimple, 5a8, is provided at the distal end of the cantilever load spring, 5a5. Alternatively, the dimple, 5a8, may be formed on the gimbal plate, 5b3. The low mass load spring, 5a5, ideally, has a near zero spring rate so that the force applied to the slider by the load spring changes only slightly over the displacement range of the slider, i.e., flying height. Its mass, which is significantly less than the mass of the flexible load beam which it replaces, significantly reduces the inertia of the transducer assembly, 5c, of which it is a part.

Figure 3:
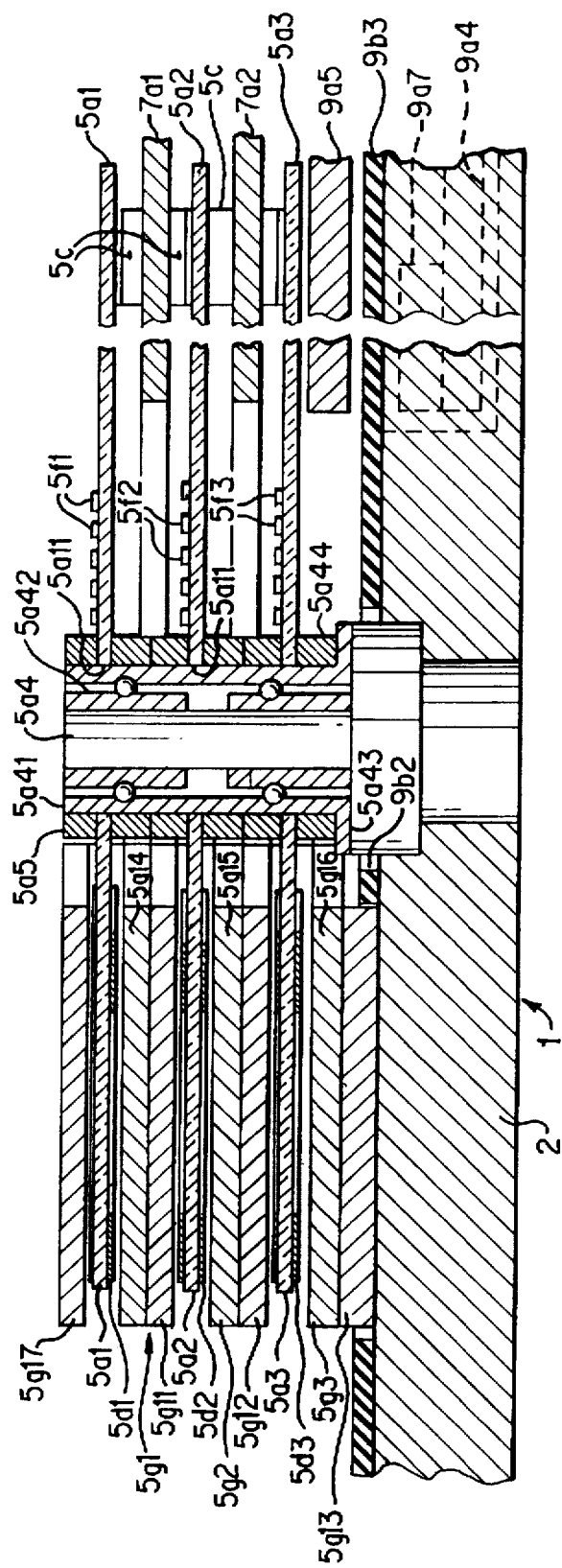
FIG. 3, is an enlarged sectional view of the actuator armstack viewed in the section plane taken on the line III—III of FIG. 1.

The actuator armstack, 5, comprises one or more rigid arms, 5a. A cross sectional view in the section plane III—III of FIG. 1, is illustrated in FIG. 3. FIG. 3 assumes a plurality of rigid actuator arms, in this case three, to illustrate in a single figure of the drawings a rotary actuator structure, 5, involving a plurality of rigid arms, 5a1–5a3, in one or two head configurations.

In FIG. 3, the memory disk assembly, 7 comprises two axially spaced disks, 7a1,7a2. The mounting details of these disks are not shown, lacking space for the illustration of such details, it being understood that they are intended for mounting to the hub 9a1 of the motor rotor 9a, FIG. 2, in any conventional manner.

The rotary actuator armstack, 5, comprises a plurality of rigid actuator arms, 5a1, 5a2 and 5a3, which are stacked upon an outer, single piece, bearing race, 5a41, forming part of a coaxial bearing pair, 5a42, called a bearing cartridge, journaled upon an actuator spindle, 5a4, which is secured in the base, 2. The outer bearing race, 5a41, is provided with an outer circumferential flange, 5a43, at its bottom end, upon which the rigid arms are stacked. To this end, the rigid actuator arms, 5a1–5a3, are each provided with circular openings, 5a11, therethrough, between their distal ends, which slip over the outer bearing race, 5a41, which, in this instance, also functions as a hub for the rotary actuator armstack, 5. The openings, 5a11, in the rigid actuator arms, 5a1–5a3, are preferably located at the center of mass of each of the rigid actuator arms. Spacer rings, 5a44, between the individual rigid actuator arms, 5a1–5a3, and one between the bottom flange, 5a43, and the lowermost rigid actuator arm, 5a3, axially space the rigid actuator arms, 5a1–5a3, in dimensional correspondence to the axial spacing dimension of the memory disks, 7a1, 7a2. The gimbal springs, 5b, correspondingly position the transducer assemblies, 5c, on the distal ends of the individual rigid actuator arms, 5a1, 5a2,5a3. The rigid actuator arms, 5a1–5a3, are aligned and jigged and secured as a unit on the outer bearing race, 5a41, during assembly. Adhesive bonding is presently preferred in securing the rigid actuator arms to the outer bearing race, 5a41. Rotation of the actuator structure, 5, about the actuator spindle, 5a4, moves the transducer assemblies, 5c, together from one radial location to another over the respective surfaces of the memory disks, 7a1, 7a2, when the disk drive is in use.

The rigid actuator arms, 5a1–5a3, are preferably of single piece construction of an electrical insulating material, such as a ceramic material, or, of an electrical conducting material such as aluminum, or other light weight metal, which is provided with an electrical insulating coating, such as a polyimide film, on one or both surfaces of the rigid actuator arm, as the application may require, upon which the printed circuits may be deposited.

Each rigid actuator arm, 5a1–5a3, is provided with printed circuits, fabricated by conventional printed circuit processes, which include, respective actuator motor coils, 5d1–5d3, respective groups of individual printed circuit traces, 5e–5e3, and respective groups of individual bonding pads, 5f1–5f3, of which, coil 5d1, printed circuit traces, 5e, and bonding pad group, 5f1, are clearly seen by reference to FIG. 1. The bonding pads, 5f1, while shown on the upper surface of the rigid actuator arm, 5a1, in FIG. 1, are preferably located on the edge of the arm at that location for simplification of fabrication of the flexible cable and its bonding to the arm pads, 5f1.

The actuator motor coils, 5d1–5d3 are printed on one or both surfaces of each rigid actuator arm, 5a1–5a3. The fabrication technique employed here is the same as that employed in the fabrication of the printed circuit disk spindle motor stator winding, 9b, using vias through the rigid actuator arms, 5a1–5a3, to connect the actuator motor coil turns on the opposite surfaces of each of the rigid actuator arms, 5a1–5a3. The printed circuit traces, 5e, 5e2, 5e3, respectively, on the rigid actuator arms, respectively, connect the individual actuator motor coils, 5d1, 5d2 and 5d3 to individual bonding pads, in respective bonding pad groups, 5f1, 5f2 and 5f3. Other of the printed circuit traces, 5e–5e3, on each rigid arm connect the magnetic head of each transducer assembly, 5c1, 5c2 and 5c3, to individual bonding pads, in the respective bonding pad groups, different from those which are connected to the actuator motor winding.

Each actuator motor coil, 5d1, 5d2 and 5d3, is provided with a permanent magnet stator, 5g1, 5g2 and 5g3, respectively, as shown in FIG. 3. Each permanent magnet stator comprises a magnetic flux plate, 5g11, 5g12 and 5g13, which respectively mount a permanent magnet, 5g14, 5g15 and 5g16. The bottom magnetic flux plate, 5g13, is mounted to the base, 1, through an opening, 9b2, in the substrate of the printed circuit assembly, 9b3. The remainder of the permanent magnet stators are stacked and properly spaced upon spacers, 5h, at the ends of the individual permanent magnet stators, FIG. 1. The flux path of the permanent magnet stator stack is closed at the top by a magnetic flux plate, 5g17, FIG. 3. The individual permanent magnet stators, 5g1–5g3, are of arcuate planform configuration, as seen in FIG. 1. The flat actuator motor coils, 5d1–5d3, are also of arcuate planform configuration and swing together in respective planar arcuate paths about the axis of the actuator spindle, 5a4, when the coils are energized with current of one polarity or the reverse, to move the respective transducer assemblies to different radial locations with respect to the memory disk(s), in track seeking and track following functional modes, as is well known.

Although a permanent magnet stator, 5g1–5g3, has been provided for each printed circuit actuator motor coil, 5d1–5d3, of the actuator arm structure, 5, whether a permanent magnet stator, 5g1–5g3, is provided for one or more or all of the printed circuit actuator motor coils, 5d1–5d3, depends upon the actuator torque requirement of a particular disk drive.

A flat flexible cable, 5k, has a plurality of circuit traces, 5k1. Each circuit trace is connected to corresponding bonding pads, 5f1,5f2,5f3, on each rigid actuator arm, 5a1,5a2, 5a3. The circuit traces, 5k1, at the opposite end of the flat flexible cable, 5k, are connected to a corresponding plurality of bonding pads, 5k2, on the substrate, 9b2, of the printed circuit assembly, 9b3. The individual circuit traces, 5k1, provide connections for the actuator motor winding, 5d1, and the transducer assemblies, 5c, on each rigid actuator arm, 5a1–5a3, with circuits on the printed circuit assembly, 9b3. Details whereby the magnetic head assembly, 5c2, of a transducer assembly, 5c, may be connected to the printed circuit traces are contained in the explanations relating to FIGS. 4–8, which follow.

Rigid Actuator Arm/Transducer Assemblies

FIGS. 4 and 5, respectively, are plan and longitudinal sectional views of a rigid actuator arm/transducer assembly embodying a gimbal spring, 5b, depicting the circuit connections between the magnetic head, 5c2, of the transducer assembly, 5c, and the printed circuit traces, 5e, on the rigid arm, 5a, over the gimbal spring, 5b. FIG. 8, is an exploded perspective view of the embodiment of FIGS. 4 and 5, showing additional details. The arm/transducer assemblies, 5a1, 5a2, 5a3, being the same, a description of one suffices for all.

The rigid actuator arm, 5a1, may be of a light weight metal or of an electrical insulating material. If of a light weight metal, such as aluminum, the rigid actuator arm is coated with an electrical insulating material such as a polyimide material upon which printed circuit traces may be formed. If of an electrical insulating material, which is preferred, such as a ceramic material, carbon fiber, fiberglass, or other suitable material, the printed circuit traces may be formed directly upon the rigid actuator arm.

FIGS. 4–8 illustrate a rigid actuator arm/transducer assembly, representing the best mode, presently known, for practicing the invention. The rigid actuator arm, 5a1, is provided with printed circuit traces, 5e, which, as seen in FIG. 1, extend between bonding pads, 5f1, and the transducer assembly, 5c, and, as seen in FIGS. 4 and 8, extend over the gimbal spring, 5b. The printed circuit traces, 5e, on the rigid actuator arm, 5a1, terminate in bonding pads, 5m1–5m5. FIG. 4, of which the bonding pads, 5m1, 5m3a and 5m2, are disposed on the upper surface of the rigid actuator arm, 5a1, and the bonding pads, 5m3b, 5m4, and 5m5, are extended by vias to the lower surface of the rigid actuator arm, 5a1. The number of printed circuit traces, 5e, depends upon the requirements of the magnetic heads, 5c2, for circuit connections and upon whether one or two magnetic heads are mounted upon the distal end of the rigid actuator arm, 5a1.

The printed circuit arrangement shown provides electrical connections for two magnetic heads, preferably thin film magnetic heads, 5c21, FIG. 7. As seen in FIG. 7, which is an end view of the transducer assembly, 5c1, the thin film magnetic head assembly, 5c2, comprises two thin film magnetic heads, 5c21, each of which has a yoke, 5c22, linked by a coil, 5c23. The thin film magnetic head assembly, 5c2, is mounted or fabricated on the end of the slider, 5c1, as seen in FIGS. 5–8. This is the trailing end of the slider, 5c1, in use, as seen in FIG. 1, by reference to the arrow which indicates the direction of rotation of the memory disk assembly, 7. An end of each coil, 5c23, is connected to a solder pad, 5c25, which is a ground connection, and the remaining end of each coil, 5c23, is connected to respective solder pads, 5c24, providing separate accessing of the coils for reading or writing. In FIG. 8, the transducer assembly, 5c2, is shown above the gimbal spring, 5b, in an inverted position from its mounted position, for the purpose of illustrating the location of the solder pads, 5c24 and 5c25, on the slider, 5c1, which, when the slider is bonded to the gimbal plate, 5b3, of the gimbal spring, 5b, at assembly, are fused to solder pads, 5b24 and 5b25, on the gimbal plate, 5b3.

The gimbal spring, 5b, is fabricated of a material and of a configuration that provides for the slider, 5c1, of the transducer assembly, 5c, the required stiffness in yaw, in lateral and longitudinal translation, and the required spring loaded pitch and roll characteristics for the slider. The required spring loading of the slider, 5c1, against the disk is provided by the load spring, 5a5. At the memory disk rotational speed, the flying height of the slider is of the order of about one micro inch. The low mass load spring 5a5 has a low spring rate. As a consequence the spring loading on the slider changes little over the slider displacement range, i.e., its Z-height-tolerance.

The gimbal spring, 5b, illustrated in FIGS. 5 and 8, for the purposes of this description, is preferably of silicon which is fabricatable in wafer-like structures, of gimbal spring configurations, using conventional techniques. The gimbal spring, 5b, comprises a rectangular frame, 5b1 and a slider mounting plate, the gimbal plate, 5b3, which are connected by a pair of diametrically disposed, serpentine spring arms, 5b21. The spring arms, 5b21, provide spring loaded angular movement of the slider, 5c1, about pitch and roll axes, provide longitudinal and lateral translation stiffness and angular stiffness in yaw. Spring rate normal to the plane of the disk, in the operational displacement range, is low.

The rectangular frame, 5b1, of the gimbal spring has openings, 5b11, therethrough which are respectively aligned with individual bonding pads, 5m1–5m5, on the rigid actuator arm, 5a1. A metal coat or film is applied over the upper surface of the gimbal spring, extending through the openings, 5b12, and around the openings on the lower surface of the rectangular frame, 5b1. Thereafter photo resist is applied and the printed circuit traces, 5b26, and the patterns of the bonding pads, 5b4–5b6, are developed. The bonding pads are thus formed through the openings, 5b12, in the rectangular frame, 5b1, and form pads on the bottom side of the rectangular frame, 5b1, corresponding to those pads seen on the top side. The solder pads, 5b24, are applied in contact with the printed circuit traces, 5b26, which are routed over the spring arms, 5b21, to connect the solder pads, 5c24, to respective bonding pads, 5b4–5b6. The solder pad, 5b25, is part of the common connection for the magnetic head coils, 5c23, which may or may not be ground.

At assembly, the solder pads are placed in registration and are fused to connect the magnetic head coils, 5c23, to the respective bonding pads, 5b4 and 5b5, via the respective printed circuit traces, 5b26. Joining of the solder pad, 5c25, of the slider, 5c1, to the solder pad, 5b25, on the gimbal plate, 5b3, of the gimbal spring, connects the common ends of the magnetic head coils, 5c23, to the common circuit at the gimbal spring. The solder bonds secure the slider, 5c1, to the gimbal plate, 5b3. Where more secure bonding of the slider is required, the slider is additionally adhesively bonded to the gimbal plate, 5b3.

The rectangular frame, 5b1, of the gimbal spring, 5b, is adhesively bonded to the distal end of the rigid arm, 5a, about the opening, 5a61, with the bonding pads, 5b4–5b6 on the rectangular frame, 5b1, of the gimbal spring, in registration with the respective bonding pads, 5m1,5m3a and 5m2, on the rigid actuator arm, 5a1. Solder bump reflow of the bonding pads, 5b4,5b5, with the bonding pads, 5m1,5m2, connects the two coils, 5c23, of the magnetic heads, 5c21, to respective bonding pads, 5k2, FIG. 1, on the printed circuit substrate, 5b2, via individual printed circuit traces, 5e, individual bonding pads, 5f1, FIG. 1, and the flexible circuit, 5k. The bonding pad, 5b6, couples the common ends of the magnetic head coils, 5c23, to the bonding pad, 5m3a, on the rigid actuator arm, 5a1. The bonding pad, 5m3a, is connected to a system ground via a printed circuit trace, 5e, a bonding pad, 5f1, FIG. 1, circuits, 5k1, of the flexible cable, 5k, and a bonding pad, 5k2, on the substrate, 9b2. Although connections for both magnetic head coils, 5c23 are made in this assembly, only one coil is employed in operation of the disk drive. Conventional etching or micro machining techniques and integrated circuit techniques are employed in fabricating and assembling parts herein.

If it is necessary to mount a second transducer assembly, 5c, upon the distal end of the rigid actuator arm, 5a, FIG. 5, an assembly of a gimbal spring, 5b, and transducer assembly, 5c, the same as that on the upper surface of the arm, is simply inverted from the position seen on the upper surface of the arm and bonded to the bottom or lower surface of the rigid arm, 5a, at its distal end, with the bonding pads, 5b4,5b5, joined to the bonding pads, 5m5,5m4, respectively, on the lower surface. The vias at the bonding pads, 5m4, 5m5, connect the magnetic head windings, 5c23, of this second head to individual printed circuit traces, 5e, on the upper surface of the arm, 5a, and, thence, to the bonding pads, 5k2, FIG. 1, on the printed circuit assembly substrate, 5b2. Joining of the bonding pads, 5b6,5m3b, by the via for the pad, 5m3b, connects the common ends of the magnetic head coils, 5c23, of the second transducer assembly on the lower surface of the rigid actuator arm, 5a1, to the grounded printed circuit trace, 5e, on the upper surface of the rigid actuator arm, 5a1.

While the printed circuit traces, 5e, are all fabricated on the upper surface of the rigid actuator arm, 5a1, as viewed, those for the bottom head may be fabricated on the bottom side of the rigid actuator arm.

While the rigid actuator arm/transducer assembly has been described using a ceramic arm, 5a, and a gimbal spring, 5b, of silicon, it will be appreciated that the rigid actuator arm, 5a1, may be fabricated, as a first choice, of a thin metal, having marginal stiffening flanges, may be fabricated of a light weight metal, such as aluminum, coated with an insulating material, such as a polyimide material. Further, the rigid actuator arm, 5a1, may be fabricated of a thin spring metal and the gimbal spring, 5b, fabricated as an integral part of the thin metal arm, according to present practice. The actuator arm is then made rigid by applying a coating of a material, such as a ceramic material, of sufficient thickness to stiffen the arm in a degree to meet the operational requirements.

The gimbal spring may be of metal, fabricated by micro machining and coated with an insulating material such as a polyimide material on which the printed circuits may be formed.

Fabrication of a silicon gimbal spring, 5b, is accomplished by fabricating integrated circuit wafers or chips formed with lithographic, deposition, dry and wet etching techniques, etc., according to one process, the wafers are coated with photo resist and the gimbal spring pattern is developed in the photo resist. Using reactive ion etching, the gimbal spring, 5b, is physically shaped, including openings, 5b12, in the rectangular frame, 5b1, at the locations of the bonding pads, 5b4–5b8, FIG. 8. Next, the surface of the gimbal spring is coated with an electrical conductive metal film, aluminum, or copper, for example, from which the printed circuit traces and bonding pads will be formed. Photo resist is applied to the gimbal spring and the pattern of the printed circuit traces, 5b26, and bonding pads, 5b4–5b8, is developed in the photo resist, including the circuit paths over one of the springs, 5b21. Thereafter the excess metal is etched away, leaving the illustrated printed circuit traces, 5b26, and bonding pads, 5b4–5b8. The solder pads, 5b24 and 5b25 may be applied at this stage of development, or, at an earlier stage, after the application of the metal film but prior to the application of the photo resist, in preparation for development of the printed circuit pattern.

What is claimed is:

1. A disk drive, comprising:
   a. a disk stack of at least two axially spaced disks, each disk having opposite disk surfaces, a disk surface of one disk confronting a disk surface of the other disk between the disks;
   b. a disk motor for rotating said disk stack;
   c. a movably mounted actuator armstack comprising at least one inflexible actuator arm having a distal end projecting between the confronting disk surfaces of the axially spaced disks, said distal and of said inflexible actuator arm having opposite arm surfaces;
   d. a gimbal spring mounted to each arm surface of said distal end of said inflexible actuator arm;

e. a transducer assembly mounted to each gimbal spring, each transducer assembly having a transducer facing a respective disk surface of said confronting disk surfaces;

f. a load spring mounted to said at least one inflexible actuator arm, said load spring having an elongated portion extending through an opening in said inflexible actuator arm to said each gimbal spring for biasing said each transducer assembly toward said respective disk surface;

g. a group of bonding pads mounted to said inflexible actuator arm;

h. printed circuit traces mounted to said gimbal springs and to said inflexible actuator arm, connecting each transducer to bonding pads of said group of bonding pads, and i. an actuator motor for moving said actuator armstack to move said distal end of said at least one inflexible actuator arm to different radial locations between said confronting disk surfaces.

2. The disk drive according to claim 1 in which said actuator motor comprises:

a. a printed circuit coil mounted to said inflexible actuator arm and a permanent magnet stator, and b. printed circuit traces mounted to said inflexible actuator arm connecting said printed circuit coil of said actuator motor to other bonding pads of said group of bonding pads.

3. The disk drive according to claim 1 in which said actuator armstack additionally comprises:

a. a second inflexible actuator arm in said actuator armstack, said second inflexible actuator arm having a distal end projecting over the remaining surface of said opposite surfaces of one of said disks;

b. a second gimbal spring mounted to said distal end of said second inflexible actuator arm;

c. a second transducer assembly mounted to said second gimbal spring of said second inflexible actuator arm and having a transducer facing said remaining surface of said opposite surfaces of said at least one of said one of said disks;

d. a second load spring mounted to said second inflexible arm, said second load spring having an elongated portion extending through the opening in said inflexible actuator arm to said second gimbal spring of said second inflexible actuator arm for biasing said second transducer assembly of said second inflexible actuator arm toward said remaining surface;

e. a second group of bonding pads mounted to said second inflexible actuator arm;

f. second printed circuit traces mounted to said second gimbal spring of said second inflexible actuator arm and to said second inflexible actuator arm, connecting said transducer of said second inflexible actuator arm to said bonding pads of said second group of bonding pads mounted to said second inflexible actuator arm, and g. a second actuator motor for moving said second inflexible actuator arm.

4. The disk drive according to claim 3, in which:

a. said second inflexible actuator arm is aligned and secured in a stack with said at least one inflexible actuator arm in said actuator armstack.

5. The disk drive according to claim 3 in which said second actuator motor comprises:

a. a printed circuit coil, mounted to said second inflexible actuator arm, and a permanent magnet stator.

6. The disk drive according to claim 5 in which:

a. said movably mounted actuator armstack is a pivotally mounted rotary actuator armstack having an axis of rotation between said distal end and said printed circuit winding.

7. The disk drive according to claim 5, in which:

a. said printed circuit coil and said permanent magnet stator of said second actuator motor are aligned in a stack with said printed circuit coil and said permanent magnet stator of said at least one inflexible actuator arm.

8. A disk drive, comprising:

a. a disk sack having a plurality of axially spaced disks having confronting disk surfaces;

b. a rotary actuator armstack comprising a plurality of axially spaced, individual inflexible actuator arms secured in a stack for rotation about an axis, the axial spacing corresponding to the axial spacing of said disks, each inflexible actuator arm having a transducer distal end on one side of said axis and a motor distal and on the other side of said axis, each distal end having opposite surfaces, the transducer distal ends being respectively disposed between said axially spaced disks;

c. a gimbal spring mounted to each of the opposite surfaces at the distal end of each inflexible actuator arm;

d. a transducer assembly mounted to each gimbal spring, each transducer assembly having a transducer facing a respective disk surface of said confronting disk surfaces;

e. an actuator motor printed circuit coil on at least one surface of the opposite surfaces of the motor distal end of each said inflexible actuator arm;

f. an actuator motor permanent magnet stator for each of at least some of said printed circuit coils, the permanent magnet stators being stacked and respectively aligned with said at least some of said printed circuit coils;

g. a group of bonding pads mounted to each inflexible actuator arm;

h. printed circuit traces on each inflexible actuator arm mounted to each gimbal spring and to said each inflexible actuator arm, connecting each transducer to individual bonding pads of the group of bonding pads on said each inflexible actuator arm and connecting each printed circuit winding to other individual bonding pads of said group of bonding pads on said each inflexible actuator arm; and, j. a load spring mounted to each of said inflexible actuator arms, each load spring having an elongated portion extending through an opening in each inflexible actuator arm to each gimbal spring for biasing said each transducer assembly toward said respective disk surface.

9. The disk drive according to claim 8, in which:

a. said printed circuit coil is fabricated on both surfaces of the motor distal end of said each inflexible actuator arm.

* * * * *